(12) United States Patent
Robertson

(10) Patent No.: US 10,948,113 B1
(45) Date of Patent: Mar. 16, 2021

(54) LONGITUDINAL EXPANSION JOINT FOR PIPING SYSTEM

(71) Applicant: Freudenberg Oil & Gas, LLC, Houston, TX (US)

(72) Inventor: David Robertson, Tjodalyng (NO)

(73) Assignee: Freudenberg Oil & Gas, LLC, Houston, TX (US)

( * ) Notice: Subject to any disclaimer, the term of this patent is extended or adjusted under 35 U.S.C. 154(b) by 0 days.

(21) Appl. No.: 16/701,134

(22) Filed: Dec. 2, 2019

(51) Int. Cl.
*F16L 27/12* (2006.01)

(52) U.S. Cl.
CPC ............................... *F16L 27/12751* (2019.08)

(58) Field of Classification Search
CPC .................................. F16L 15/02; F16L 27/12
USPC ........................................................ 285/302
See application file for complete search history.

(56) References Cited

U.S. PATENT DOCUMENTS

| | | | |
|---|---|---|---|
| 713,113 A * | 11/1902 | Kraemer et al. | B67D 1/0832 |
| | | | 285/302 |
| 3,860,271 A | 1/1975 | Rodgers | |
| 5,195,756 A | 3/1993 | Wachter | |
| 6,622,987 B2 | 9/2003 | Sterud | |
| 8,220,839 B2 * | 7/2012 | Hall | F16L 27/125 |
| | | | 285/302 |
| 8,833,802 B2 | 9/2014 | Morris | |
| 2013/0076026 A1 * | 3/2013 | Guidry | E21B 19/00 |
| | | | 285/302 |

* cited by examiner

*Primary Examiner* — David Bochna
(74) *Attorney, Agent, or Firm* — Daniel J. Sepanik, Esq.; Harness, Dickey & Pierce, P.L.C.

(57) ABSTRACT

A longitudinal expansion joint for piping systems, includes a first casing member and a second casing member telescopically engaged with a second end of the first casing member, the second casing member having a first end adapted to connect to a second pipe and having a second end with a flange portion having a threaded outer surface. A longitudinal adjustment mechanism for longitudinally adjusting a position of the second casing member relative to the first casing member. A locking sleeve for locking a longitudinal position of the second casing member relative to the first casing member. A sealing system including a seal unit disposed between the first casing member, and the second casing member and a push plate disposed against the seal unit. A seal energizing system pushes against the push plate to energize the seal unit to seal between the first casing member and the second casing member.

5 Claims, 4 Drawing Sheets

LONGITUDINAL EXPANSION JOINT FOR PIPING SYSTEM

FIELD

The present disclosure relates to a longitudinal expansion joint for piping system.

BACKGROUND

This section provides background information related to the present disclosure which is not necessarily prior art.

Piping systems for subsea oil wells are commonly constructed of prefabricated piping components based upon dimensions and models that closely approximate the real system. However, it is common that prefabricated piping system is not accurately dimensioned for the real world environment. Accordingly, it is desirable to provide an expansion joint that accommodates for inaccurate dimensioning of the piping system.

SUMMARY

This section provides a general summary of the disclosure, and is not a comprehensive disclosure of its full scope or all of its features.

According to a first aspect of the present disclosure, a longitudinal expansion joint for piping systems, includes a first casing member and a second casing member telescopically engaged with a second end of the first casing member, the second casing member having a first end adapted to connect to a second pipe and having a second end with a flange portion having a threaded outer surface. A longitudinal adjustment means for longitudinally adjusting a position of the second casing member relative to the first casing member. A locking means for locking a longitudinal position of the second casing member relative to the first casing member. A sealing system including a seal unit disposed between the first casing member, and the second casing member and a push plate disposed against the seal unit. A seal energizing means pushes against the push plate to energize the seal unit to seal between the first casing member and the second casing member.

The longitudinal adjustment means can include a first plate surrounding the second casing member and a second plate surrounding the first casing member and being connected to and spaced from the first plate by a plurality of support rods. A third plate disposed between the first plate and the second plate and disposed against a shoulder of the first casing member. The third plate member includes a plurality of first apertures that receive the plurality of support rods. The longitudinal adjustment means further includes a locking sleeve rotatably disposed between the first plate and the third plate and having an internal threaded surface engaging the threaded outer surface of the flange portion of the second casing member, wherein the locking sleeve can be rotated relative to the second casing member to longitudinally adjust a position of the second casing member relative to the first casing member;

The locking means can include a plurality of threaded rods extending from the flange portion of the second casing member and extending through a second plurality of apertures in the third plate, the locking means further including a plurality of nuts disposed on the plurality of threaded rods, wherein the nuts can be rotated along the threaded rods to engage the third plate and lock the longitudinal position of the second casing member relative to the first casing member.

The seal energizing means can include a twist ring disposed between the locking sleeve and the first plate, the twist ring and the first plate defining a cam mechanism there between, the seal energizing means further including a plurality of push rods that are supported by the second plate and extending through a plurality of second apertures in the third plate and disposed against an energizing sleeve disposed adjacent to the push plate, wherein rotation of the twist ring relative to the first plate causes the first plate and the second plate to move longitudinally relative to the twist ring and causes the push rods to push the energizing sleeve against the push plate to energize the seal unit to seal between the first casing member and the second casing member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
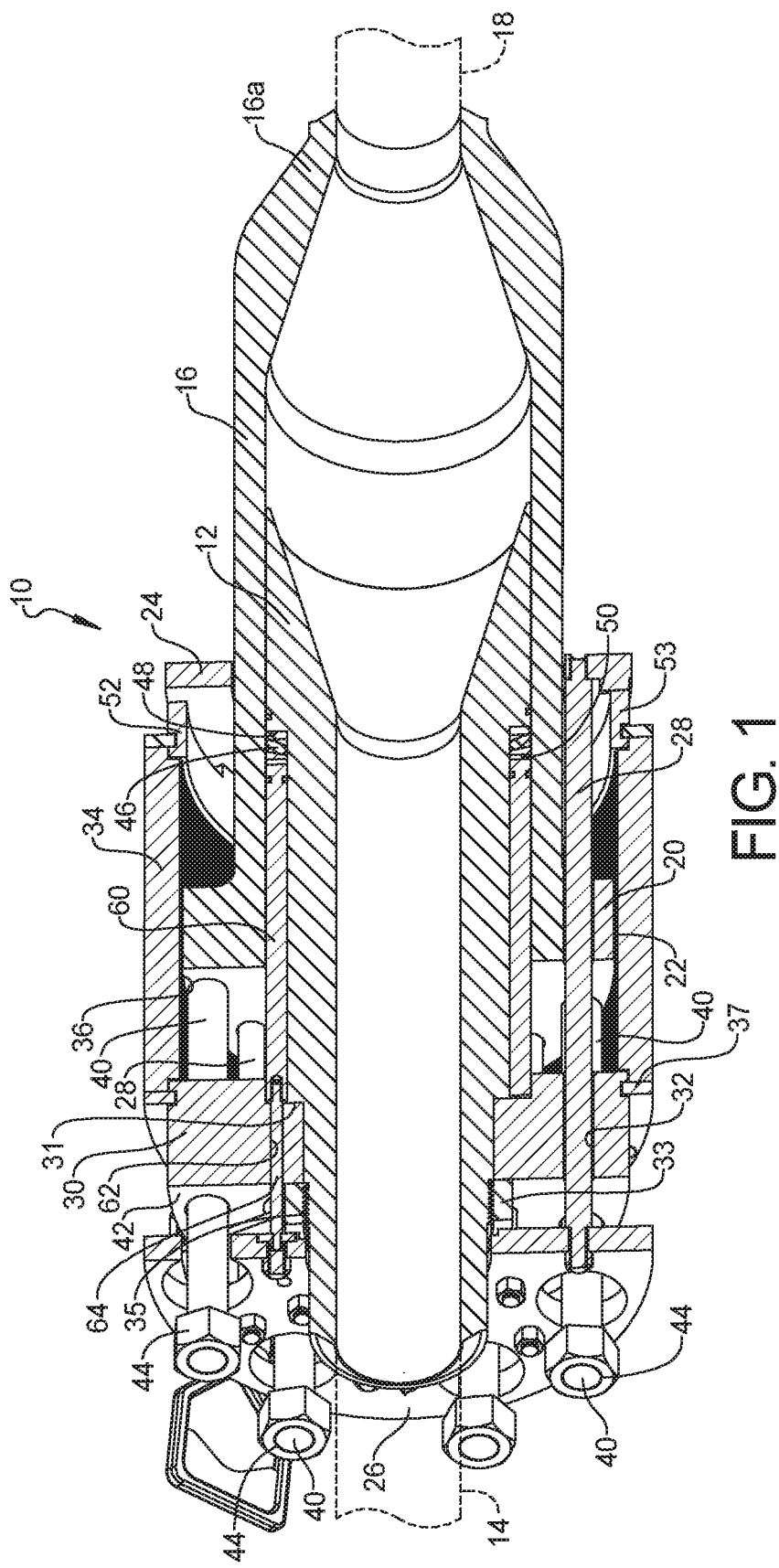
FIG. 1 is a cross-sectional perspective view of a longitudinal expansion joint for a piping system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a longitudinal expansion joint 10 for piping systems is shown. The longitudinal expansion joint 10 includes a first casing member 12 having a first end 12a adapted to connect to a first pipe 14. A second casing member 16 is telescopically engaged with a second end 12b of the first casing member 12. The second casing member 16 includes a first end 16a adapted to connect to a second pipe 18 and having a second end 16b with a flange portion 20 having a threaded outer surface 22.

A longitudinal adjustment mechanism includes a first plate 24 surrounding the second casing member 16 and a second plate 26 surrounding the first casing member 12 and being connected to and spaced from the first plate 24 by a plurality of support rods 28. The adjustment mechanism further includes a third plate 30 disposed between the first plate 24 and the second plate 26 and disposed against a shoulder of the first casing 12. The third plate member 30 includes a plurality of first apertures 32 that receive the plurality of support rods 28. The third plate 30 can be secured against a shoulder 31 of the first casing member 12 by a nut 33 that engages a threaded section 35 of the first casing member 12. The adjustment mechanism further includes a locking sleeve 34 rotatably disposed between the first plate 24 and the third plate 30 and having an internal threaded surface 36 engaging the threaded outer surface 22 of the flange portion 20 of the second casing member 16. The third plate 30 is supported to the locking sleeve 34 by a retaining ring 37 that is secured to the locking sleeve 34 by fasteners 39. The locking sleeve 34 can be rotated relative to the second casing member 16 so that the threaded interface between the locking sleeve 34 and the second casing member 16 longitudinally adjusts a position of the second casing member 16 relative to the first casing member 12. In a subsea oil well application, a remotely operated vehicle can be deployed under sea to rotate the locking sleeve 34. By way of non-limiting example, the locking sleeve 34 can be provided with external gear teeth for engagement by a gear drive system of a remotely operated vehicle to rotate the locking sleeve 34. Other alternative driving mechanisms can be utilized. In addition, it should be understood that the longitudinal adjustment mechanism can utilize other types of longitudinal adjustment mechanisms other than the threaded connection between the locking sleeve 34 and the second casing member 16, such as ball and screw mechanisms can also be used.

A locking mechanism includes a plurality of threaded rods 40 extending from the flange portion 20 of the second casing member 16 and extending through a second plurality of apertures 42 in the third plate 30. The locking mechanism further including a plurality of nuts 44 disposed on the plurality of threaded rods 40. The nuts 44 can be rotated along the threaded rods 40 to engage the third plate 30 and lock the longitudinal position of the second casing member 16 relative to the first casing member 12. In a subsea oil well application, a remotely operated vehicle can be deployed under sea to rotate the nuts 44. In addition, it should be understood that the locking mechanism can utilize other types of locking mechanisms such as clamps, pins and other devices that can prevent the relative movement of the first and second casing members 12, 16 can also be used.

A sealing system includes a seal unit 46 disposed between the first casing member 12 and the second casing member 16. The seal unit 46 can be disposed against a shoulder 48 of the first casing member 12. A push plate 50 is disposed against the seal unit 46 opposite to the shoulder 48. The seal unit 46 can be made from a corrosion resistant alloy (CRA) and can be configured as an annular ring that can be egg-shaped in cross-section.

Figure 5:
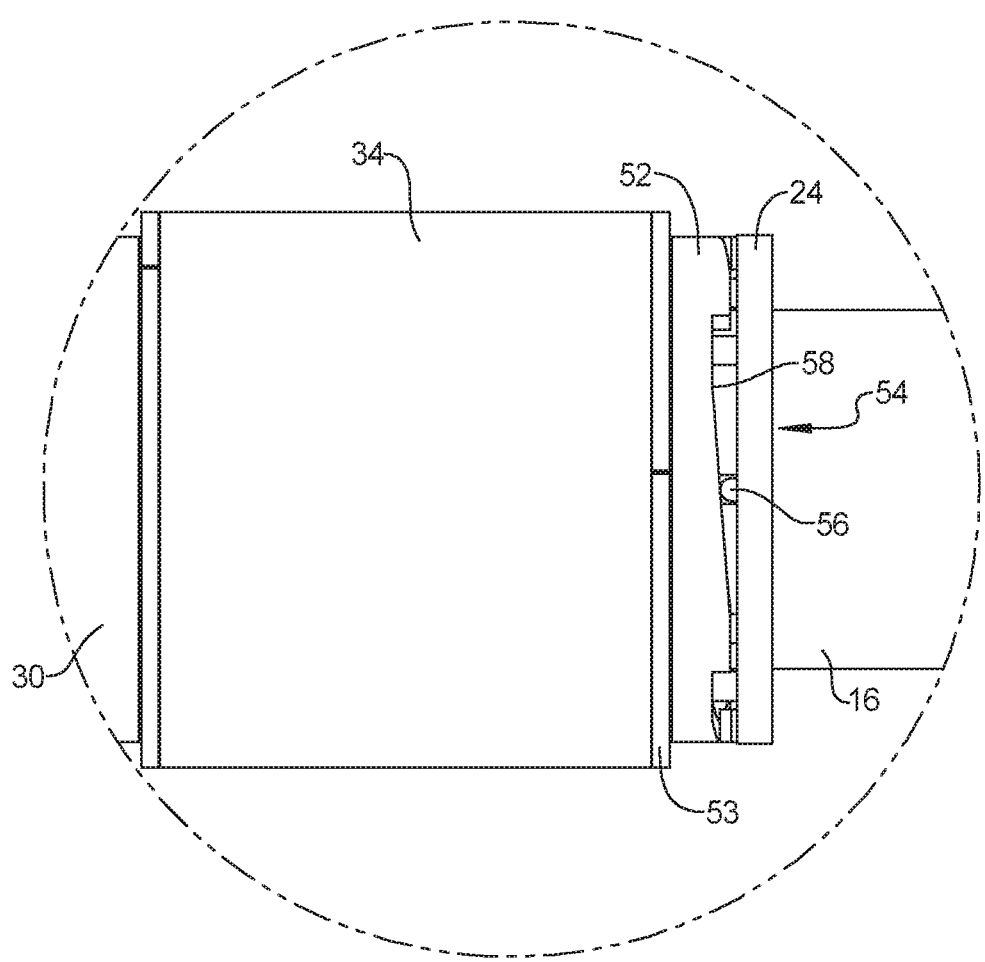
FIG. 5 is a side plan view of the cam mechanism of the twist ring of the longitudinal expansion joint.
Figure 6:
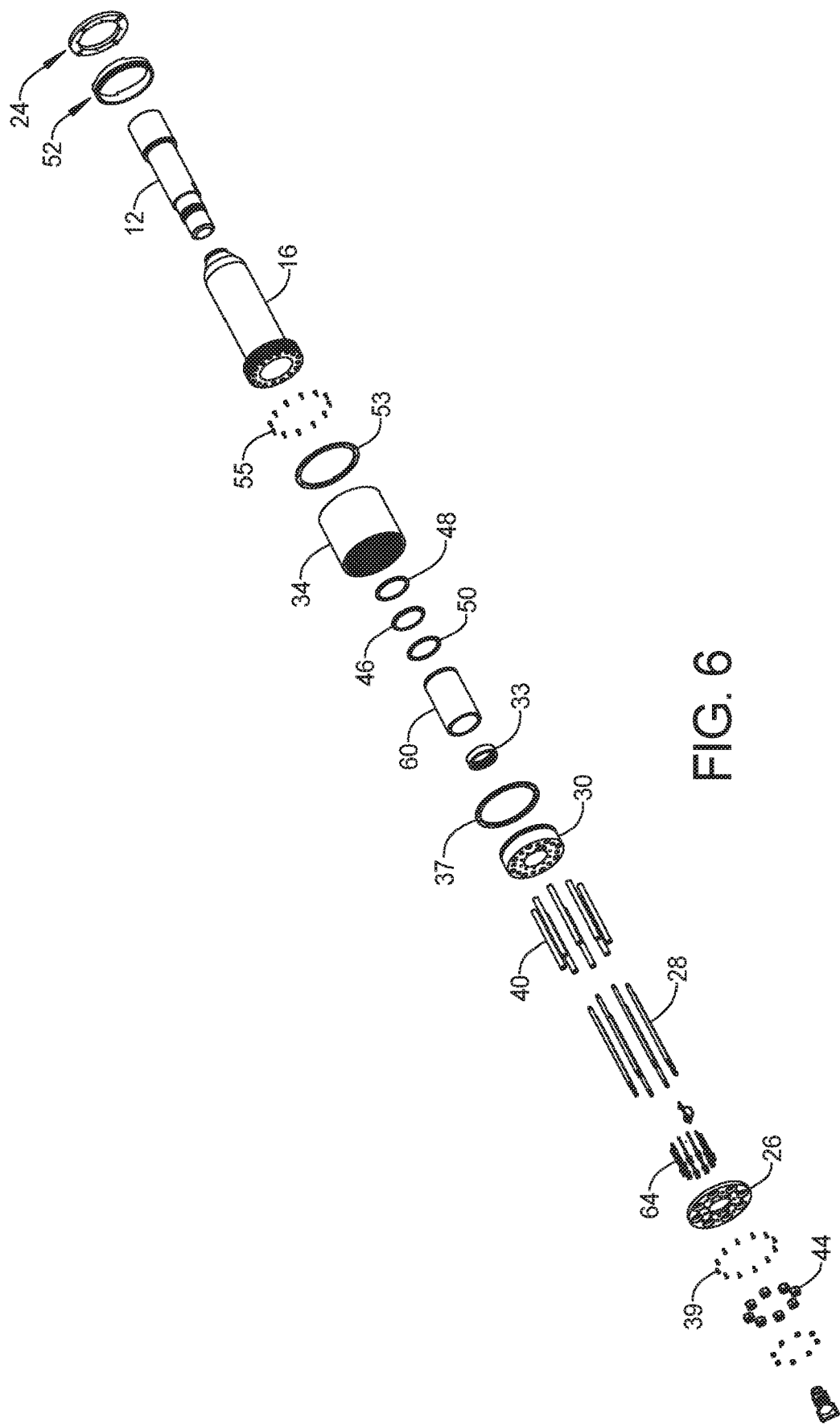
FIG. 6 is an exploded perspective view of the components of the longitudinal expansion joint according to the principles of the present disclosure.

A seal energizing system includes a twist ring 52 disposed between the locking sleeve 34 and the first plate 24. The twist ring 52 is supported by a guide ring 53 that is secured to the locking sleeve by fasteners 55. As best shown in FIG. 5, the twist ring 52 and the first plate 24 defining a cam mechanism 54 there between with at least one (preferably two or more) cam members 56 on the first plate 24 and a cam surface 58 on the twist ring 52. The seal energizing system further includes a plurality of push rods 60 that are supported by the second plate 26 and extend through a plurality of second apertures 62 in the third plate 30 and disposed against an energizing sleeve 64 disposed adjacent to the push plate 50. Rotation of the twist ring 52 relative to the first plate 24 causes the first plate 24 and the second plate 26 to move longitudinally relative to the twist ring 52 as the cam members 56 ride up the cam surfaces 58 and causes the push rods 60 to push the energizing sleeve 64 against the push plate 50 to energize the seal unit 48 to seal between the first casing member 12 and the second casing member 16. In a subsea oil well application, a remotely operated vehicle can be deployed under sea to rotate the twist ring 52. In addition, it should be understood that the seal energizing system can utilize other types of cam mechanisms for energizing the seal unit 46.

Figure 2:
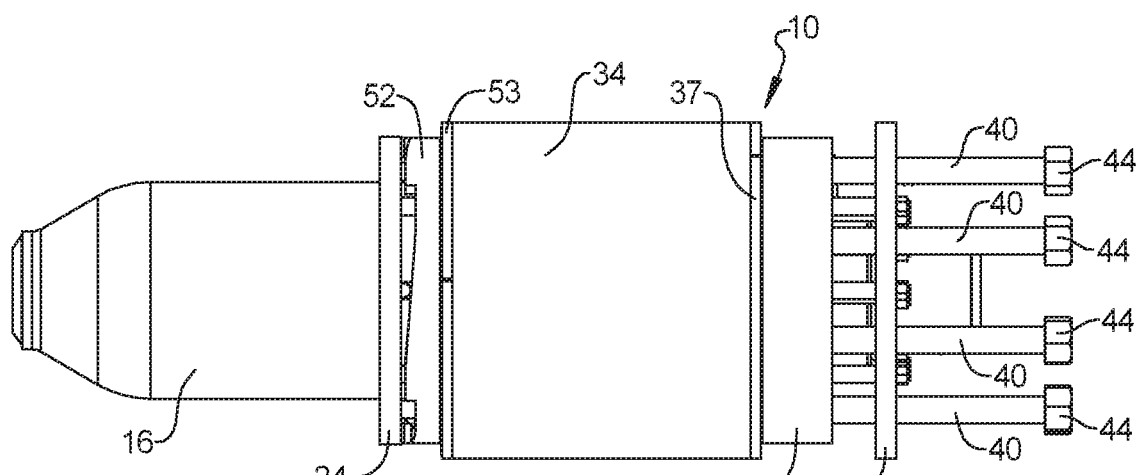
FIG. 2 is a side plan view of the longitudinal expansion joint shown in a pre-assembled condition.
Figure 3:
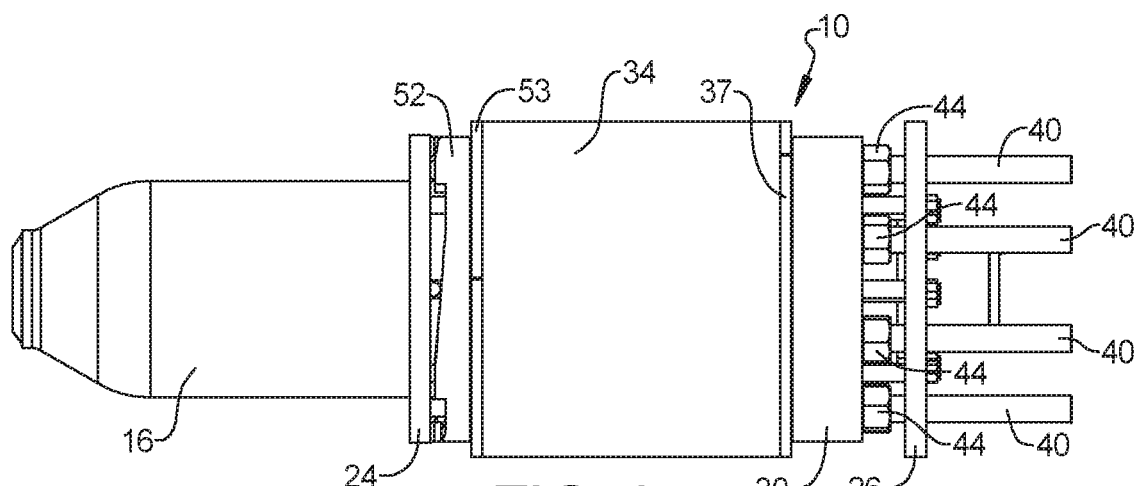
FIG. 3 is a side plan view of the longitudinal expansion joint shown in a minimum extension condition.
Figure 4:
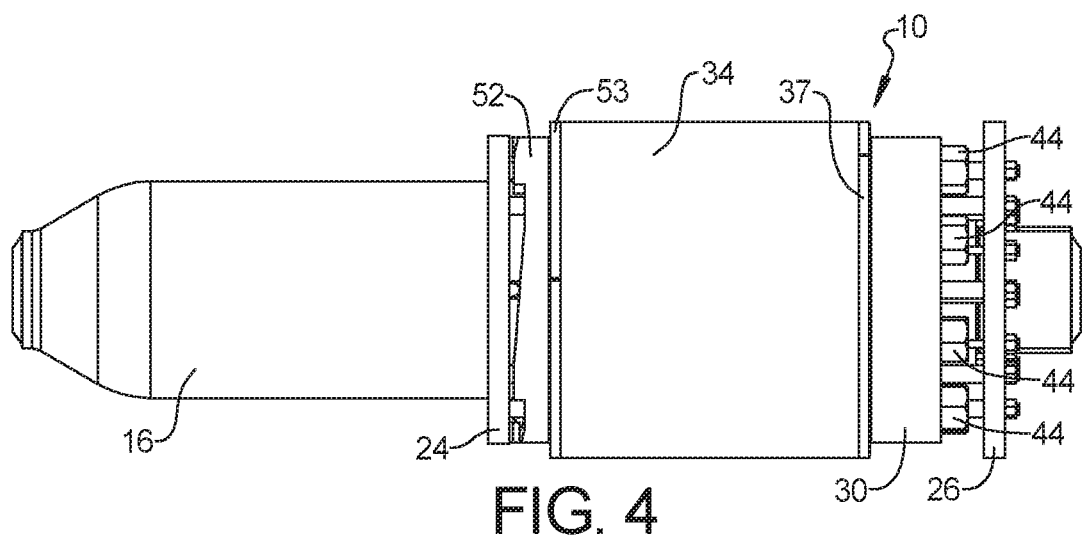
FIG. 4 is a side plan view of the longitudinal expansion joint shown in a maximum extension condition.

FIG. 2 shows the longitudinal expansion joint 10 in a preassembled condition. FIG. 3 shows the longitudinal expansion joint 10 in a minimum expansion assembled condition. FIG. 4 shows the longitudinal expansion joint 10 in a maximum expansion assembled condition. According to one aspect of the present disclosure, the longitudinal expansion joint allows the expansion of 12 inches or more depending upon the configuration. The longitudinal expansion joint allows for inaccuracies in the dimensions of the oil well design so that new longer or shorter piping components do not need to be fabricated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A longitudinal expansion joint for piping systems, comprising:
    a first casing member having a first end adapted to connect to a first pipe;
    a second casing member telescopically engaged with a second end of the first casing member, the second casing member having a first end adapted to connect to a second pipe and having a second end with a flange portion having a threaded outer surface;
    a longitudinal adjustment mechanism including a first plate surrounding the second casing member and a second plate surrounding the first casing member and being connected to and spaced from the first plate by a plurality of support rods, the adjustment mechanism further including a third plate disposed between the first plate and the second plate and disposed against a shoulder of the first casing member, the third plate member including a plurality of first apertures that receive the plurality of support rods, the adjustment mechanism further including a locking sleeve rotatably disposed between the first plate and the third plate and having an internal threaded surface engaging the threaded outer surface of the flange portion of the second casing member, wherein the locking sleeve can be rotated relative to the second casing member to longitudinally adjust a position of the second casing member relative to the first casing member;
    a locking mechanism including a plurality of threaded rods extending from the flange portion of the second casing member and extending through a second plurality of apertures in the third plate, the locking mechanism further including a plurality of nuts disposed on the plurality of threaded rods, wherein the nuts can be rotated along the threaded rods to engage the third plate and lock the longitudinal position of the second casing member relative to the first casing member;
    a sealing system including a seal unit disposed between the first casing member and the second casing member and a push plate disposed against the seal unit; and
    a seal energizing system including a twist ring disposed between the locking sleeve and the first plate, the twist ring and the first plate defining a cam mechanism there between, the seal energizing system further including a plurality of push rods that are supported by the second plate and extending through a plurality of second apertures in the third plate and disposed against an energizing sleeve disposed adjacent to the push plate, wherein rotation of the twist ring relative to the first plate causes the first plate and the second plate to move longitudinally relative to the twist ring and causes the push rods to push the energizing sleeve against the push plate to energize the seal unit to seal between the first casing member and the second casing member.

2. The longitudinal expansion joint according to claim 1, wherein the third plate is secured to the first casing member by a nut engaging a threaded section of the first casing member.

3. The longitudinal expansion joint according to claim 1, wherein the seal unit is made from corrosion resistant alloy.

4. The longitudinal expansion joint according to claim 1, wherein a longitudinal position of the first casing member can be adjusted relative to the second casing member by at least 12 inches.

5. A longitudinal expansion joint for piping systems, comprising:
    a first casing member having a first end adapted to connect to a first pipe;
    a second casing member telescopically engaged with a second end of the first casing member, the second casing member having a first end adapted to connect to a second pipe and having a second end with a flange portion having a threaded outer surface;
    longitudinal adjustment means for longitudinally adjusting a position of the second casing member relative to the first casing member;
    locking means for locking a longitudinal position of the second casing member relative to the first casing member;
    a sealing system including a seal unit disposed between the first casing member and the second casing member and a push plate disposed against the seal unit; and
    seal energizing means for pushing against the push plate to energize the seal unit to seal between the first casing member and the second casing member.

\* \* \* \* \*